US007225615B2

(12) United States Patent
Bankestad et al.

(10) Patent No.: US 7,225,615 B2
(45) Date of Patent: Jun. 5, 2007

(54) METHOD AND A DEVICE FOR CONTROLLING A VEHICLE AND A COMPUTER PROGRAM FOR PERFORMING THE METHOD

(75) Inventors: Nils-Erik Bankestad, Eskilstuna (SE); Bo Vigholm, Stora Sundby (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 10/907,501

(22) Filed: Apr. 4, 2005

(65) Prior Publication Data

US 2005/0241304 A1 Nov. 3, 2005

Related U.S. Application Data

(63) Continuation of application No. PCT/SE03/01566, filed on Oct. 8, 2003.

(30) Foreign Application Priority Data

Oct. 8, 2002 (SE) .................................. 0202964

(51) Int. Cl.
*F16D 31/02* (2006.01)

(52) U.S. Cl. ........................................................ 60/431

(58) Field of Classification Search .................. 60/422, 60/431

See application file for complete search history.

(56) References Cited

U.S. PATENT DOCUMENTS

| | | | | |
|---|---|---|---|---|
| 3,583,243 | A | 6/1971 | Wilson | |
| 4,024,710 | A * | 5/1977 | Zelle | 60/422 |
| 4,537,029 | A * | 8/1985 | Gunda et al. | 60/422 |
| 4,712,376 | A | 12/1987 | Hadank et al. | |
| 5,267,441 | A | 12/1993 | Devier et al. | |
| 5,527,156 | A | 6/1996 | Song | |
| 5,996,701 | A | 12/1999 | Fukasawa et al. | |
| 6,183,210 | B1 * | 2/2001 | Nakamura | 60/431 |
| 6,195,989 | B1 * | 3/2001 | Hall et al. | 60/422 |
| 6,282,891 | B1 * | 9/2001 | Rockwood | 60/422 |
| 6,393,838 | B1 * | 5/2002 | Moriya et al. | 60/422 |
| 2002/0087244 | A1 * | 7/2002 | Dix et al. | 701/50 |

FOREIGN PATENT DOCUMENTS

EP 0111208 6/1984

* cited by examiner

*Primary Examiner*—F. Daniel Lopez
(74) *Attorney, Agent, or Firm*—WRB-IP LLP

(57) ABSTRACT

In method and a device for controlling a vehicle, the vehicle includes an engine arranged to drive at least one pair of half shafts and to drive at least one pump. The pump is arranged to supply a hydraulic system including at least a first hydraulic component with hydraulic oil. According to the method, the power consumed by the hydraulic system is determined. In addition, the determined consumed power is compared with a reference value, and if the detected consumed power exceeds the reference value, the maximum available power for the hydraulic system is limited. The power limitation is carried out by the maximum available movement of at least a first flow-regulating valve in the hydraulic system being limited.

38 Claims, 5 Drawing Sheets

METHOD AND A DEVICE FOR CONTROLLING A VEHICLE AND A COMPUTER PROGRAM FOR PERFORMING THE METHOD

The present application is a continuation of PCT/SE2003/001566, filed Oct. 8, 2003, which claims priority to SE 0202964-3, filed Oct. 8, 2002, both of which are incorporated by reference.

BACKGROUND AND SUMMARY

The present invention relates to a method for controlling a vehicle that comprises an engine arranged to drive at least one pair of half shafts and to drive at least one pump which is arranged to supply a hydraulic system comprising at least one hydraulic component with hydraulic oil, according to which method the power consumed by the hydraulic system is determined, the determined consumed power is compared with a reference value, and if the detected consumed power exceeds the reference value, the maximum available power for the hydraulic system is limited.

The invention also relates to a computer program for performing the method and to a device for controlling a vehicle.

The vehicle preferably comprises a working machine, such as a wheel-mounted loader, or a dumper.

There is a desire to reduce the emissions from diesel engines. This desire is driven not least by increasingly stringent legislation. A consequence of this is that a number of engines have too low a torque at low engine speeds. A mechanical loader, with a torque converter in the drive line and a hydraulic system for supplying among other things the lifting and tilting cylinders of the loader's loading unit and shovel and control cylinders for the steering, requires high torque even at low engine speeds. If the driver utilizes the power from the engine at low engine speeds to drive the vehicle's half shafts at the same time as the hydraulic system is activated, then there is a danger that the engine will cut out or that the engine will "stick", that is it will not be able to increase the engine speed when the driver depresses the accelerator pedal. The driver can, of course, adjust the power consumption via various controls, but this can be problematical, particularly when the engine suddenly cuts out.

In U.S. Pat. No. 5,996,701 a control device is described for a working vehicle which is equipped with a hydraulic system for operating a piece of equipment, for example a shovel, and for turning the vehicle. The control device is intended to prevent the engine cutting out during operation. A first hydraulic pump is driven by the vehicle's engine and is arranged to raise or lower the piece of equipment. A second hydraulic pump with variable displacement is also driven by the vehicle's engine and is arranged to turn the body of the vehicle.

A load on the piece of equipment is detected and when the load exceeds a predetermined value, the maximum displacement for the second pump is reduced. By this means, the load is reduced which arises from the turning of the vehicle and the engine is prevented from cutting out. In other words, the handling of the vehicle's piece of equipment is given priority over the steering of the vehicle, by the displacement of the second pump being reduced.

It is desirable to achieve a method for controlling a vehicle which solves the problem of the engine cutting out and which makes possible more cost-effective operation and/or a more cost-effective system.

According to an aspect of the present invention, power limitation is carried out by the maximum available movement of at least one flow-regulating valve in the hydraulic system being limited. By a limited movement of the valve is meant that it can only be moved a certain limited amount, or in other words that the opening for the through-flow of the hydraulic oil is limited. In the existing hydraulic system of the working vehicle, there is already a plurality of movable flow-regulating valves. By controlling one or more of these, it is possible to achieve a cost-effective system/vehicle in a simple way. The flow-regulating valve can, for example, comprise a directional valve.

According to an aspect of the invention, the consumed power is determined by a flow being determined that is supplied from the pump, and in particular to the hydraulic component, and by the determined flow value being multiplied by a special pressure value, with the product giving a value for the consumed power. The determination of the flow and the pressure value can be carried out in a plurality of more or less accurate ways.

According to an aspect of the invention, a movement is detected of a first movable control means, such as a control lever, which is arranged to regulate the hydraulic component, and the size of the movement is utilized to determine the flow value to the component. More specifically, the signal from the control lever is sent to a computer unit and processed there, after which the computer unit sends a signal to the flow-regulating valve to control this. This is particularly advantageous when the hydraulic system is of a so-called load-detecting type. With such a load-detecting system, the pressure drop across a valve is in principle constant, which means that the flow is only dependent upon the movement of the movable control means.

According to a further aspect of the invention, the pressure is measured in the flow that is supplied to the hydraulic component, and the measured pressure is utilized as the special pressure value for the determination of the consumed power. According to an alternative embodiment, a pressure value is utilized which is characteristic of the hydraulic component. According to yet another alternative embodiment, the pressure value is changed depending upon the operational application. In addition, an estimated average value can be utilized for several different hydraulic components or operational applications.

It is also desirable to achieve a device for controlling a vehicle that solves the problem of the engine cutting out and that makes possible more cost-effective operation and/or a more cost-effective system/vehicle.

According to an aspect of the invention, a device for controlling a vehicle is provided. The device comprises a hydraulic system comprising at least one pump which is arranged to supply at least a first hydraulic component with hydraulic oil, the pump being connected to the vehicle's engine for driving the pump, the device comprising means for determining the power consumed by the hydraulic system, means for comparing the determined consumed power with a reference value, and means for limiting the maximum available power for the hydraulic system, the power-limiting means comprising a flow-regulating valve in the hydraulic system.

According to an aspect of the invention, the device comprises a computer unit which comprises software for the determination of the power consumed by the hydraulic system and the comparison of the determined consumed power with a reference value, and comprises the computer unit being connected to the first flow-regulating valve.

BRIEF DESCRIPTION OF THE DRAWINGS

The invention will be described in greater detail in the following, with reference to the embodiments that are illustrated in the enclosed drawings, in which.

DETAILED DESCRIPTION

Figure 1:
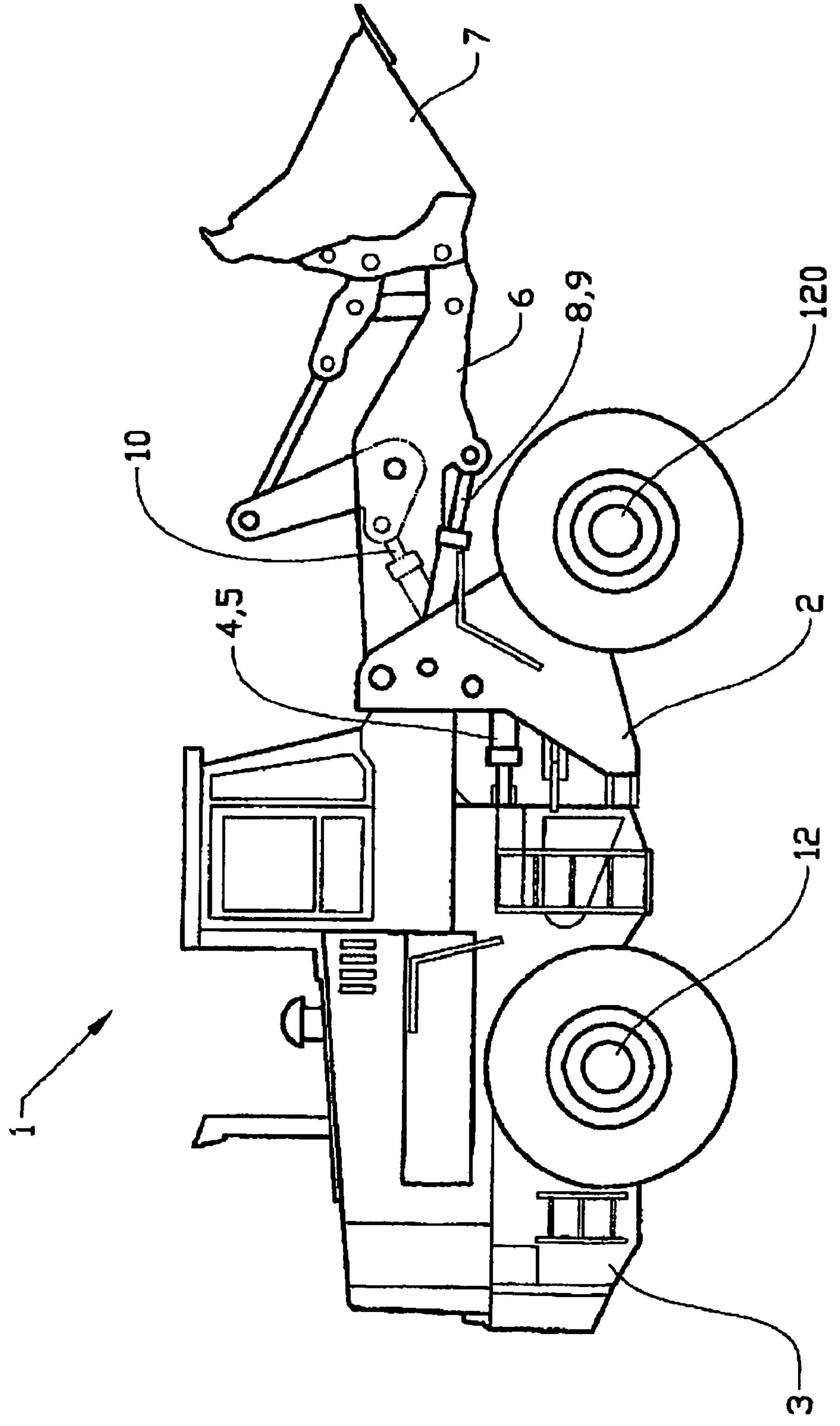
FIG. 1 shows schematically a wheel-mounted loader in a side view.

FIG. 1 shows a wheel-mounted loader 1. The body of the wheel-mounted loader 1 comprises a front body section 2 and a rear body section 3, which sections each have a pair of half shafts 12,120. The body sections are connected to each other in such a way that they can pivot. The body sections 2,3 can pivot in relation to each other around an axis by means of two first hydraulic components in the form of hydraulic cylinders 4,5 arranged between the two sections. The hydraulic cylinders 4,5 are thus arranged to turn the wheel-mounted loader 1.

In addition, the wheel-mounted loader 1 has a load-arm unit 6 and a piece of equipment in the form of a shovel 7 fitted on the load-arm unit. The load-arm unit 6 can be raised and lowered relative to the front section 2 of the vehicle by means of two second hydraulic components in the form of two hydraulic cylinders 8,9, each of which is connected at one end to the front vehicle section 2 and at the other end to the load-arm unit 6. The shovel 7 can be tilted relative to the load-arm unit 6 by means of a third hydraulic component in the form of a hydraulic cylinder 10, which is connected at one end to the front vehicle section 2 and at the other end to the shovel 7 via a link-arm system.

Figure 2:
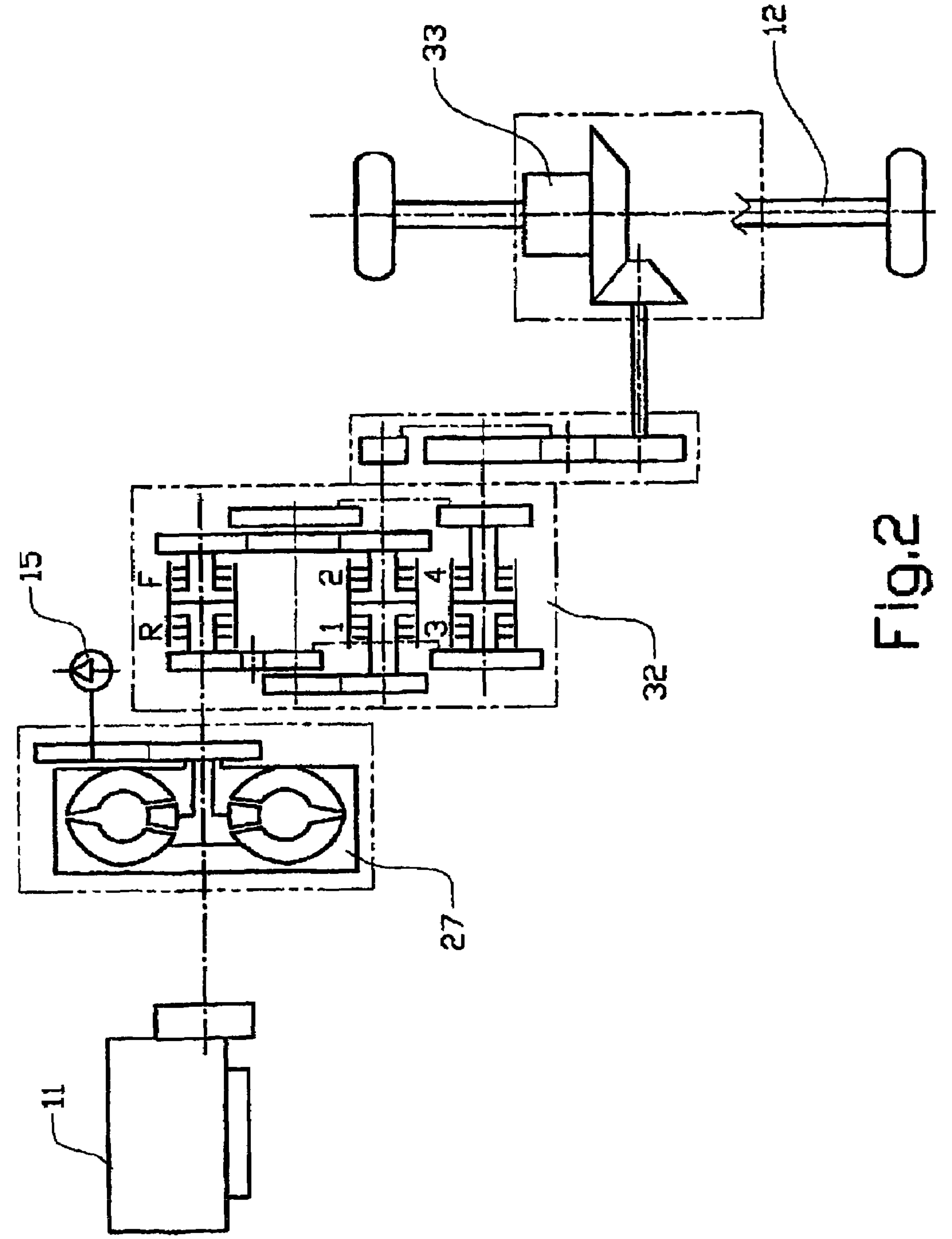
FIG. 2 shows schematically the drive-line of the wheel-mounted loader.

FIG. 2 shows in a simplified sketch the drive line of the wheel-mounted loader 1. The vehicle 1 has a diesel engine 11, which is arranged to drive the front pair of half shafts 120 and the rear pair of half shafts 12 via a hydrodynamic torque converter 27, a gearbox 32 and a differential 33. The engine 11 also drives at least one pump 15 for supplying a hydraulic system.

Figure 3:
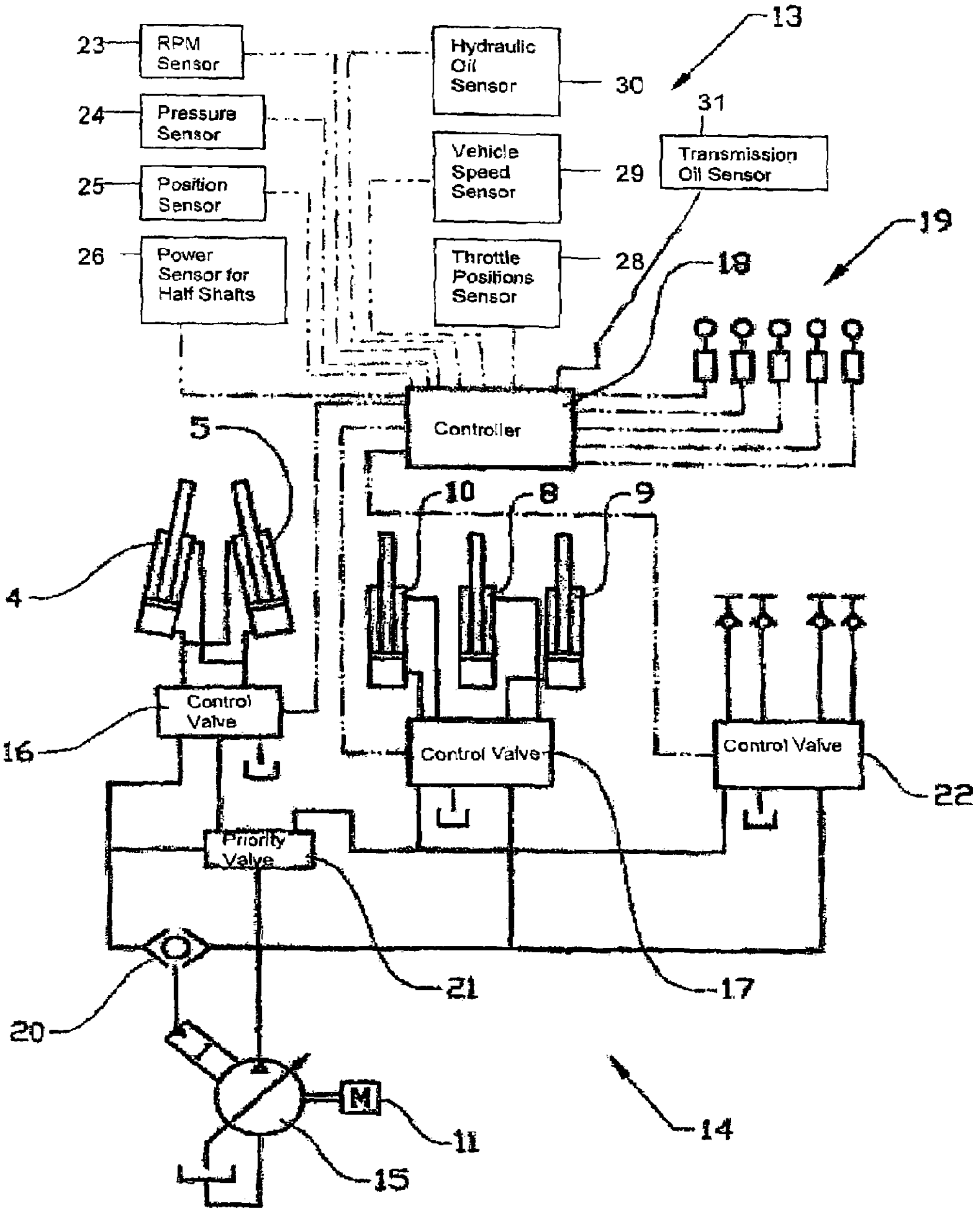
FIG. 3 shows a device for controlling the wheel-mounted loader.
Figure 4:
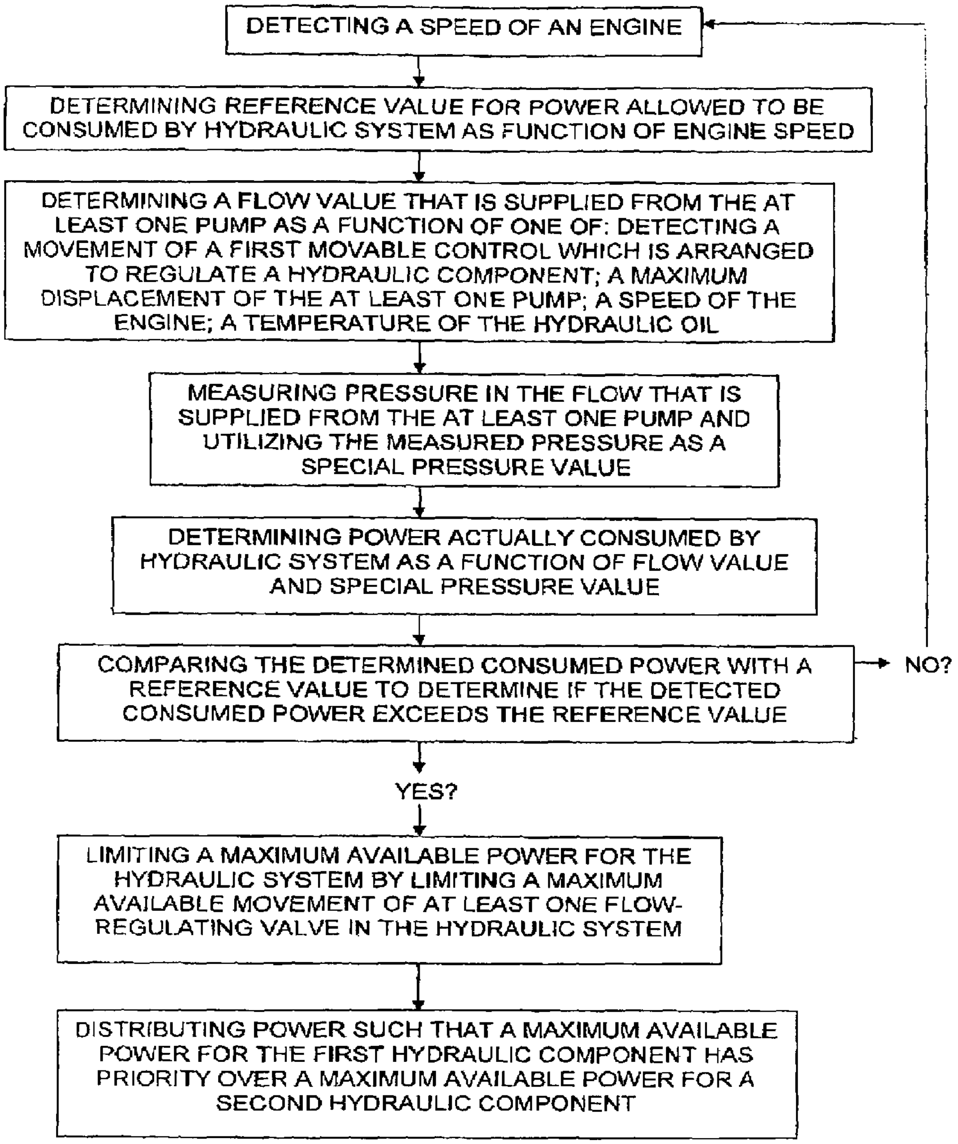
FIG. 4 is a flow chart showing a method according to an aspect of the present invention.

FIG. 3 illustrates a device 13 for controlling the wheel-mounted loader 1. The solid lines show the hydraulic hoses and the broken lines show the paths for electrical signals. The control device 13 comprises the hydraulic system 14 comprising the pump 15 which is arranged to supply the hydraulic components 4,5, 8,9, 10 with hydraulic oil. FIG. 4 is a flow chart describing a method for controlling the wheel-mounted loader.

The hydraulic system 14 comprises a first flow-regulating valve 16 in the form of a control valve, which is arranged to regulate the control cylinders 4,5. The hydraulic system 14 comprises in addition a second flow-regulating valve 17 in the form of a loading valve, which is arranged to regulate the lifting and tilting cylinders 8,9, 10.

The control device 13 comprises a computer unit 18 which is connected to the first and second valves 16,17 for regulating/moving these. The control device comprises in addition a set of manually movable control means 19, in the form of levers, which are arranged to be accessible to the driver inside the cab of the wheel-mounted loader 1. The movable control means 19 are connected to the computer unit 18.

The hydraulic system 14 is of the load-detecting type, which means that the pump 15 only supplies oil when it is required and where it is required. This means that more engine power remains for driving the half shafts.

In addition, this leads to a reduced fuel consumption.

The pump 15 detects the pressure from the hydraulic cylinders via a shuttle valve 20 and via the valve that is activated. The pump thereafter sets a pressure that is a specific number of bar higher than the pressure of the cylinders. The number of bar by which the pressure is higher is determined by the constant pressure drop across the valve in question. Accordingly, there is an oil flow out to the cylinders, the level of which depends on by how much the activated control valve is adjusted.

The hydraulic system 14 comprises, in addition, a prioritizing means 21, which is arranged to ensure that the steering has a higher priority than the loading, that is to say if the control cylinders 4,5 and the loading/tilting cylinders 8,9, 10 are used simultaneously, it is the control cylinders that have priority. The prioritization is carried out completely hydraulically.

An additional valve 22 is shown in FIG. 3. This valve 22 is intended to regulate the supply of hydraulic oil to a hydraulic unit for a piece of equipment and is connected hydraulically to the pump 15 via the prioritizing valve 21 and electrically to the computer unit 18. In the description above, the piece of equipment has been a shovel 7, but it can however comprise, for example, a fork or gripping arms. The hydraulic unit for the piece of equipment can, for example, comprise an operating cylinder for the gripping arms for moving these in relation to each other or an operating cylinder for a fork for moving the two prongs in relation to each other. The prioritizing valve is also arranged to give the steering hydraulics priority over the hydraulics for the piece of equipment in question.

As mentioned above, the engine 11 drives both the pairs of half shafts 12,120 and the pump or pumps 15 for the hydraulic system 14. In certain operating situations, it is desirable to limit the maximum available power for the hydraulic system 14 so that sufficient power is available for driving the half shafts 12,120. The computer unit 18 therefore comprises software for determining or estimating the instantaneous power consumed by the hydraulic system 14 and for comparison of the determined consumed power with a reference value. If the detected consumed power exceeds the reference value, the maximum available power for the hydraulic system is limited by the maximum available movement of at least one of the flow-regulating valves 16,17 being limited.

The reference value for the hydraulic power corresponds to the engine's speed being able to be increased, or at least to the engine not cutting out in the event of attempted acceleration. In other words, it is ensured by the reference value for the hydraulic power that the engine can provide sufficient power to the half shafts.

The reference value can also include a set of reference values, which, for example, defines a curve for power consumption dependent upon the engine speed.

The hydraulic power is obtained by the pressure being multiplied by the flow. According to a first embodiment, it is assumed that the machine operates on average with a particular pressure. This means that it is sufficient for the computer unit 18 to keep track of which flows go to different functions. As mentioned above, the machine has a load-detecting system, which means that the pressure drop across a valve is in principle constant. This means that the flow is only dependent upon the movement of the lever, which the computer unit 18 receives as an input signal from the control levers 19. The computer unit 18 thus sends out suitably processed signals to the flow-regulating valve.

In particular at lower engine speeds, the pump capacity is insufficient for satisfying the functions that are activated. The control device 13 comprises means 23 for detecting the speed of the engine 11. The computer unit 18 can determine the flow from the pump 15 by means of the detected engine speed which, together with the pump's predefined maximum displacement, gives the pump speed, and by the movement of the lever.

The pressure value is set to a particular average pressure, which can be set differently for different functions or the same for all functions.

Thereafter the computer unit 18 calculates the consumed hydraulic power by multiplying the determined flow (which is determined by the movement of the lever, if necessary reduced due to the pump capacity) by the pressure value.

The computer unit 18 thereafter limits the output signals to the valves 16,17, 22 so that the sum of all the calculated hydraulic power does not exceed a specific level. The specific level is dependent upon the engine speed produced by the engine, which the computer receives as an input signal from the detecting means 23.

A plurality of further developments of the embodiment described above are described below, with regard to the determination of the hydraulic power, which can be used either as a supplement or an alternative to the methods described above.

According to a first further development, the device comprises one or more pressure sensors 24 in the hydraulic system for measuring a pressure value that is then used for the calculation of the consumed hydraulic power. The pressure sensor 24 is therefore connected to the computer unit 18. The pressure sensor 24 is located, for example, at the outlet of the pump. If several independent pumps are used, then sensors are located at each pump. The sensor 24 can alternatively be located out in the functions, for example in a hydraulic cylinder.

According to a second further development, for certain functions, for example those that are not controlled electrically, a position sensor 25 is located on a cylinder or other mechanically movable part. The position sensor 25 is connected to the computer unit 18. The computer unit 18 thus receives the position of the function as an input signal and calculates the speed and thereby also the flow for these functions.

Figure 5:
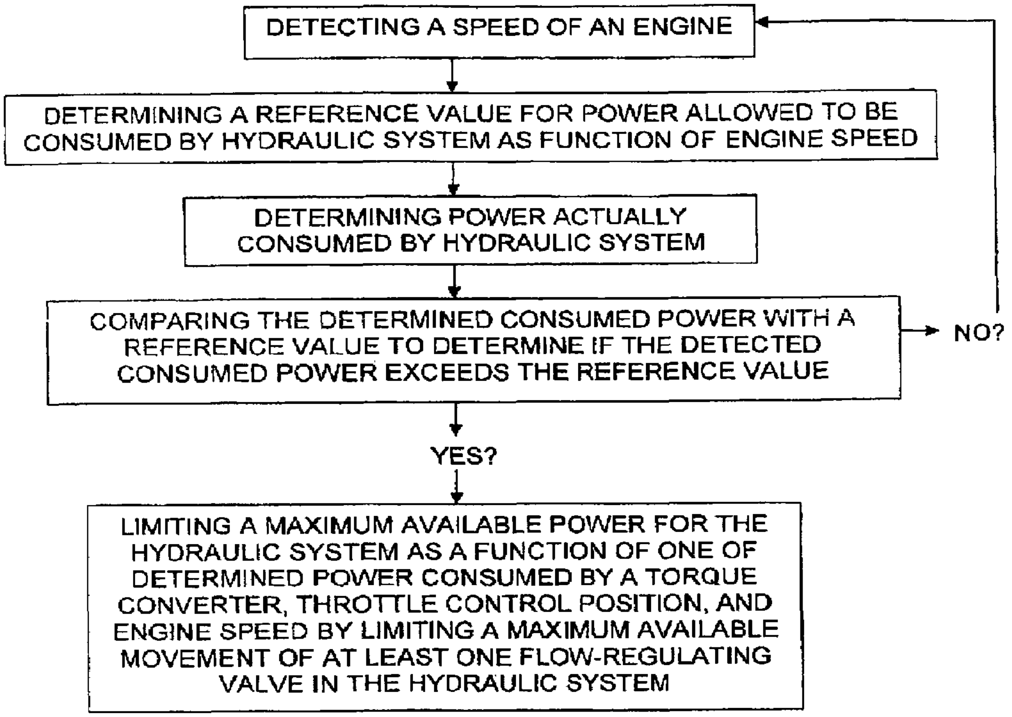
FIG. 5 is a flow chart showing a method according to another aspect of the present invention.

As seen with reference to FIG. 5, according to a third further development, the device comprises means 26 for detecting the power consumption to the pair of half shafts 12. This means 26 comprises, for example, sensors for detecting the respective speeds of the incoming shaft and outgoing shaft of the torque converter 27. The detecting means 26 is connected to the computer unit 18. By this means, the maximum power consumption of the hydraulic system is determined, also depending upon the instantaneous power consumption of the transmission.

According to a fourth further development, the device comprises means 28 for detecting the position of a throttle control fitted in the vehicle, in the form of an accelerator pedal. The detecting means 28 is connected to the computer unit 18. Using this, the computer unit 18 records whether the driver wants to remain at the current instantaneous engine speed or whether the driver depresses the accelerator pedal further with the aim of increasing the engine speed.

The power limitation for the hydraulics can thereby be increased if the driver, for example, depresses the accelerator pedal to the floor, which means that the engine increases its speed more quickly.

According to a fifth further development, the device comprises means 29 for measuring the speed of the vehicle. The speed measuring means 29 is connected to the computer unit 18. The power limitation for the hydraulics can thereby also be made to be dependent upon the speed of the machine, which means that the power limitation can be made indirectly dependent upon the type of handling.

According to a sixth further development, the device comprises means 30 for measuring the temperature of the hydraulic oil. The temperature measuring means 30 is connected to the computer unit 18. The hydraulic oil temperature is used with the aim of obtaining greater precision when the flow is determined, and accordingly when the hydraulic power consumption is calculated.

According to a seventh further development, the device comprises means 31 for measuring the temperature of the transmission oil. The temperature measuring means 31 is connected to the computer unit 18. The transmission oil temperature is used with the aim of obtaining greater precision when calculating the power consumption of the torque converter.

The vehicle's computer unit 18 comprises a memory, which in turn comprises a computer program product with computer program segments, or program code, for carrying out all the steps according to the method described above when the program is run. The computer program product can be the actual software for performing the method or a piece of hardware on which the software is stored, that is a disk or the like.

By the expression hydraulic component is meant not only a hydraulic cylinder for straight-line movement, but also, for example, a hydraulic motor for rotating movements.

The invention is not to be regarded as being limited to the embodiments described above, a number of further variants and modifications being possible within the framework of the following claims. For example, it would be possible for the vehicle only to drive one pair of half shafts, either temporarily or permanently.

In addition, vehicles with more than two pairs of half shafts are included, for example three pairs of half shafts, which is the case with a dumper, that is to say an articulated vehicle.

According to an alternative to the embodiments described above, certain functions can be controlled directly mechanically or hydraulically by the levers, without going via the computer unit.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

There are various alternatives for how one or more functions are to be limited. It will not always be desirable to limit certain functions or else these can be limited to a certain extent. Such a function is, for example, steering of the machine. The computer thus prioritizes certain functions initially. Thereafter, secondary prioritizations can be carried out and finally the remaining functions can be limited by a certain percentage in relation to the maximum flow or also by a certain percentage in relation to the movement of the lever that the driver is making at that instant.

What is claimed is:

1. Method for controlling a vehicle, the vehicle comprising an engine, the engine being arranged to drive at least one pair of half shafts and to drive at least one pump, the at least one pump being arranged to supply a hydraulic system comprising at least one hydraulic component with hydraulic oil, the method comprising determining power consumed by the hydraulic system, comparing the determined consumed power with a reference value to determine if the detected consumed power exceeds the reference value, if the detected consumed power exceeds the reference value, limiting a maximum available power for the hydraulic system, by limiting a maximum available movement of at least one flow-regulating valve in the hydraulic system, wherein the consumed power is determined by determining a flow that is supplied from the at least one pump, and multiplying the determined flow value by a special pressure value, with a product of multiplying the determined flow value by the special pressure value giving a value for the consumed power.

2. Method as claimed in claim 1, comprising detecting a movement of a first movable control which is arranged to regulate the hydraulic component and utilizing a size of the movement for determining the flow value for the hydraulic component.

3. Method as claimed in claim 1, wherein a maximum displacement of the at least one pump is utilized for determining the flow value.

4. Method as claimed in claim 1, comprising detecting a speed of the engine and utilizing the detected engine speed for determining the flow value.

5. Method as claimed in claim 1, wherein the hydraulic component is of a type with parts that can move in relation to each other, the method comprising detecting a position of the movable parts and utilizing the detected position for determining the flow value.

6. Method as claimed in claim 1, comprising measuring a temperature of the hydraulic oil and utilizing the measured temperature for determining the flow value.

7. Method as claimed in claim 1, comprising measuring pressure in the flow that is supplied from the at least one pump and utilizing the measured pressure as the special pressure value for determining the consumed power.

8. Method for controlling a vehicle, the vehicle comprising an engine, the engine being arranged to drive at least one pair of half shafts and to drive at least one pump, the at least one pump being arranged to supply a hydraulic system comprising at least one hydraulic component with hydraulic oil, the method comprising determining power consumed by the hydraulic system, comparing the determined consumed power with a reference value to determine if the detected consumed power exceeds the reference value, if the detected consumed power exceeds the reference value, limiting a maximum available power for the hydraulic system, by limiting a maximum available movement of at least one flow-regulating valve in the hydraulic system, wherein the vehicle comprises a torque converter connected to the engine, the method comprising determining power consumed by the torque converter, and limiting the maximum available power for the hydraulic system as a function of the determined power consumed by the torque converter.

9. Method for controlling a vehicle, the vehicle comprising an engine, the engine being arranged to drive at least one pair of half shafts and to drive at least one pump, the at least one pump being arranged to supply a hydraulic system comprising at least one hydraulic component with hydraulic oil, the method comprising determining power consumed by the hydraulic system, comparing the determined consumed power with a reference value to determine if the detected consumed power exceeds the reference value, if the detected consumed power exceeds the reference value, limiting a maximum available power for the hydraulic system, by limiting a maximum available movement of at least one flow-regulating valve in the hydraulic system, measuring a speed of the vehicle, and limiting the maximum available power for the hydraulic system as a function of the measured speed.

10. Device for controlling a vehicle, the vehicle comprising an engine, comprising a hydraulic system comprising at least one pump, the at least one pump being arranged to supply at least one hydraulic component with hydraulic oil, the at least one pump being connected to the engine for driving the at least one pump, a controller for determining the power consumed by the hydraulic system, and for comparing the determined consumed power with a reference value, and a flow-regulating valve in the hydraulic system for limiting the maximum available power for the hydraulic system, wherein the device comprises a sensor for measuring power consumed by a torque converter connected to the engine.

11. Method for controlling a vehicle, the vehicle comprising an engine, the engine being arranged to drive at least one pair of half shafts and to drive at least one pump, the pump being arranged to supply a hydraulic system with hydraulic oil, the system comprising a plurality of hydraulic components and a plurality of flow-regulating valves for regulating the hydraulic oil from the pump to the respective hydraulic components for controlling different functions, the method comprising determining power consumed by the hydraulic system, determining a power reference value such that the engine does not cut out in the event of an increased depression of an accelerator pedal, comparing the determined consumed power with the reference value to see if the detected consumed power exceeds the reference value, if the detected consumed power exceeds the reference value, then limiting a maximum available power for the hydraulic system, by individually controlling a maximum available displacement of each of the flow-regulating valves in the hydraulic system for limiting of at least one of the functions.

12. Method as claimed in claim 11, wherein the valve is arranged to regulate the hydraulic component.

13. Method as claimed in claim 11, comprising detecting a speed of the engine.

14. Method as claimed in claim 13, wherein the reference value is determined as a function of the detected engine speed.

15. Method as claimed in claim 11, wherein a first hydraulic component of the at least one component is arranged to turn a body of the vehicle.

16. Method as claimed in claim 15, wherein the first hydraulic component comprises a hydraulic cylinder.

17. Method as claimed in claim 15, comprising distributing power such that a maximum available power for the first hydraulic component has priority over a maximum available power for a second hydraulic component.

18. Method as claimed in claim 17, comprising limiting power by limiting a maximum available movement of a second flow-regulating valve which is arranged to regulate the second hydraulic component.

19. Method as claimed in claim 17, wherein the second hydraulic component is arranged to move a piece of equipment fitted on a load-arm unit of the vehicle relative to a body of the vehicle.

20. Method as claimed in claim 17, wherein the second hydraulic component comprises a hydraulic cylinder.

21. Method as claimed in claim 11, wherein the vehicle includes a throttle control, the method comprising detecting a position of the throttle control, and limiting the maximum available power for the hydraulic system as a function of the detected throttle control position.

22. A computer readable medium encoded with a computer program product comprising computer program segments for causing a computer unit in a vehicle to carry out the steps as recited in claim 11.

23. Device for controlling a vehicle, the device comprising a hydraulic system comprising at least one pump, the pump being arranged to supply at least one hydraulic component with hydraulic oil, the pump being connected to an engine of the vehicle for driving the pump, wherein the system comprises a plurality of flow-regulating valves for regulating the hydraulic oil from the pump to the respective hydraulic components for controlling different functions, a controller for determining power consumed by the hydraulic system, for determining a power reference value so that the engine does not cut out in the event of an increased depression of an accelerator pedal, and for comparing the determined consumed power with the reference value, and the flow-regulating valves being adapted to limit a maximum available power for the hydraulic system when the controller determines that consumed power exceeds the reference value so that consumed power is no greater than the reference value, the flow-regulating valves being adapted to be individually controlled for limiting at least one of the functions.

24. Device as claimed in claim 23 wherein the valve is connected to the hydraulic component, the valve being adapted to regulate the hydraulic component.

25. Device as claimed in claim 23, wherein the controller comprises a computer unit that comprises software for determining the power consumed by the hydraulic system and for comparing the determined consumed power with the reference value, and the computer unit controls the flow-regulating valve.

26. Device as claimed in claim 23, comprising a sensor for detecting a speed of the engine.

27. Device as claimed in claim 23 wherein the device comprises a first movable control which is arranged to regulate the hydraulic component, and a controller for detecting a size of a movement of the control.

28. Device as claimed in claim 23, wherein the hydraulic component is of a type with parts that can move in relation to each other, the device comprising a position sensor for detecting a position of at least one of the movable parts.

29. Device as claimed in claim 23, wherein the device comprises a sensor for measuring a temperature of the hydraulic oil.

30. Device as claimed in claim 23, wherein the device comprises a sensor for measuring pressure in a flow that is supplied to the hydraulic component.

31. Device as claimed in claim 23, wherein a first hydraulic component of the components is arranged to turn the body of the vehicle.

32. Device as claimed in claim 31, wherein the hydraulic system comprises a second hydraulic component, and a prioritizing valve for giving one of the first and second components priority over the other.

33. Device as claimed in claim 32, wherein the second hydraulic component is arranged to move a piece of equipment fitted on a load-arm unit on the vehicle relative to the body of the vehicle.

34. Device as claimed in claim 23, wherein the hydraulic component comprises a hydraulic cylinder.

35. Device as claimed in claim 23, wherein the device comprises an accelerator pedal for detecting the position of a throttle control on the vehicle.

36. Device as claimed in claim 23, wherein the device comprises a sensor for measuring the speed of the vehicle.

37. Device as claimed in claim 23, wherein the vehicle comprises a working machine.

38. Device as claimed in claim 37, wherein the vehicle comprises a wheel-mounted loader.

* * * * *